United States Patent [19]

Kojima et al.

[11] 4,193,695
[45] Mar. 18, 1980

[54] SPECTROGRAPHIC APPARATUS WITH CHOPPER MEANS LOCATED IN THE SAMPLE CELL

[75] Inventors: Kennosuke Kojima; Takao Imaki; Kozo Ishida, all of Miyanohigashi, Japan

[73] Assignee: Horiba, Ltd., Kyoto, Japan

[21] Appl. No.: 872,586

[22] Filed: Jan. 26, 1978

[30] Foreign Application Priority Data

Feb. 12, 1977 [JP] Japan .................. 52-14471

[51] Int. Cl.$^2$ .............................. G01J 3/48
[52] U.S. Cl. ................... 356/418; 250/351; 350/275; 356/440
[58] Field of Search .......... 350/275; 356/51, 97, 356/188, 414, 418, 440; 250/343, 344, 350, 351

[56] References Cited

U.S. PATENT DOCUMENTS

| | | | |
|---|---|---|---|
| 2,058,939 | 10/1936 | Arey | 350/275 |
| 2,709,751 | 5/1955 | Meyer | 250/233 |
| 3,171,027 | 2/1965 | Wallack | 250/343 |
| 3,414,729 | 12/1968 | Warren | 356/97 |
| 3,709,600 | 1/1973 | Ganshorn | 350/275 |
| 3,715,153 | 2/1973 | Schunck et al. | 250/343 |
| 3,729,264 | 4/1973 | Simazaki et al. | 356/51 |
| 3,966,333 | 6/1976 | Marcus | 356/229 |

FOREIGN PATENT DOCUMENTS

2524430 12/1976 Fed. Rep. of Germany.

OTHER PUBLICATIONS

"On-Line Far-Infrared Michelson Interferometry in a Time-Shared Mode"; Gayles, Jr., et al.; IBM J. Res. Develop. vol. 14, #1; Jan. 1970; pp. 25-32.

*Primary Examiner*—Vincent P. McGraw
*Attorney, Agent, or Firm*—Wenderoth, Lind & Ponack

[57] ABSTRACT

An optical system for a spectroscopic analyzer. The system has a light source, a detector and a sample cell connected in a line, and in the sample cell or between the sample cell and one of the other elements is a light chopper device. The light chopper has a rotating element in the form of a disc-shaped member or members which periodically block light from the light source and pass light during the times it is not blocked. The rotating element is driven by a motor on the outside of the structure.

5 Claims, 12 Drawing Figures

SPECTROGRAPHIC APPARATUS WITH CHOPPER MEANS LOCATED IN THE SAMPLE CELL

BACKGROUND OF THE INVENTION

The present invention relates to an optical system of an apparatus such as a spectroscopic analyzer, for example an infrared spectrometer, an ultraviolet spectrometer, or the like, and more particularly the invention relates to an improvement of a chopper which is a constituent of said optical system.

BACKGROUND OF THE INVENTION AND PRIOR ART

In the optical system of an apparatus, such as an infrared spectrometer, an ultraviolet spectrometer, and the like, it is necessary to chop the flux of light emitted from a light source in order to be able to get an output signal from a detector. In the prior art, an arrangement such as is shown in FIG. 1 has been used, and in which a rotatable shaft 1 is positioned substantially parallel to the light path of the light source L and a chopper 2 is mounted on the shaft 1 so as to extend between the light outlet window 3 of the light source L and the light inlet window 4 of a sample cell. The chopper 2 is rotated as the shaft 1 is rotated by a motor M, intercepting the light from the light source L as it moves across the light path perpendicularly thereto. However, it should be pointed out that there are significant disadvantages in this arrangement. Not only is the prior art apparatus made larger than if no chopper were present due to the presence of the space 5 between the window 3 of the light source and the window 4 of the sample cell and through which the chopper 2 moves, but also the presence of such a space 5 causes an error in the spectroscopy of a gaseous speciman where a foreign gas is present in the atmospheric air. The foreign gas disturbs the analysis of the gas being analyzed, from the spectroscopic stand point, since air containing such a foreign gas can easily enter said space 5, as shown by the arrow a in FIG. 1. Any measure used to prevent the entry of such foreign gas-containing air into the space is completely impractical since it makes the apparatus too complicated and bulky. Moreover an attempt to reduce the size of the space 5 itself will fail since the chopper 2 must have a certain size in order to intercept the light effectively. These are serious defects in the prior art apparatus.

OBJECT AND BRIEF SUMMARY OF THE INVENTION

The object of the present invention is to provide an optical system with a chopper for an apparatus such as an infrared spectrometer, an ultraviolet spectometer, and the like, which has no space along the light path and accordingly, has a compact shape and is not disturbed by any foreign gas present in the atmospheric air around the apparatus during spectroscopy.

This object is accomplished by an optical system comprising a light source, a detector positioned to receive light from the light source and a sample cell connected between the light source and the detector for containing a material to be spectroscopically analyzed and for passing light from the light source therethrough to said detector, said system having no air gap between the light source and the detector, and a chopper means having at least one chopper element, a shaft on which said chopper element is mounted and extending perpendicularly to the path of light between the light source and the detector, and motor means operatively connected to said shaft for rotating said chopper element around the axis of said shaft, said chopper element being in the path of the light between the light source and the detector and having a structure for passing substantially all of the light of at least one frequency from said light source to said detector when it is in one rotational position, and for passing substantially no such light when it is in a second rotational position about 90° from said first rotational position.

BRIEF DESCRIPTION OF THE DRAWINGS

Other and further characteristic features and advantages of the present invention will be apparent from the following description taken in connection with the accompanying drawings in which.

DETAILED DESCRIPTION OF THE PREFERRED EMBODIMENTS

Figure 2:
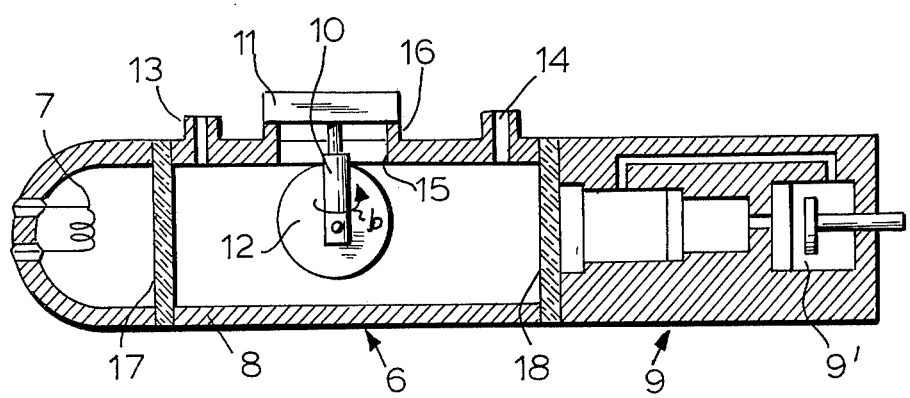
FIG. 2 is an elevation view, partially in section, of a first example of the chopper of the present invention.

FIG. 2 shows an infrared gas analyzer 6 of the so-called single cell type. The analyzer has a light source 7, a sample cell 8 and a detector having a condenser microphone 9. Chopper means is constituted by a disk-shaped chopper member 12 tightly fixed on a rotatable shaft 10 and positioned at an intermediate position between the light source 7 and the detector 9. The shaft 10 extends in a direction perpendicular to the light path from the light source 7 to the detector 9. The shaft 10 rotates in the direction shown by the arrow b being driven by a motor 11 sealed over opening 15 in the sample cell 8 by a seal 16, the shaft 10 projecting into the cell 8 through the opening 15. Accordingly, said chopper member 12 rotates by being driven by the rotatable shaft 10 and the chopper member 12 permits a maximum amount of the light beam from light source 7 to pass through the cell 8 when it is in the position shown in FIG. 2 and FIG 3 (a) and it blocks a maximum of the light when it is situated in the position shown in FIG. 3 (b). An inlet 13 and an outlet 14 for the sample of gaseous material to be analyzed are provided in the sample cell 8. Windows 17 and 18 seal the ends of cell 8 and let the infrared light pass through cell 8.

Thus, in the apparatus shown in these figures, after introducing the sample gas into the cell 8 through the inlet 13 and letting it flow into the cell 8 until some gas is exhausted from the outlet 14, the chopper member 12 is rotated by the motor 11. A maximum amount of light emitted from the light source 7 reaches the detector 9 past the chopper member 12 when the chopper member 12 is situated at the position shown in FIG. 2 and FIG. 3 (a). After the rotation of the shaft 10 through 90° from said position, when the chopper member 12 has reached the position shown in FIG. 3 (b) hardly any light emitted from the light source 7 reaches the detector 9, since it is blocked by the chopper member 12. After further rotation of the shaft 10 through 90°, that is, after rotation of the shaft 10 for 180° from the position shown in FIG. 2 and FIG. 3 (a), the chopper member 12 reaches the same position shown in FIGS. 2 and 3 (a) and allows the light to pass through cell 8. After rotation of the shaft 10 through 270° from the initial position, the chopper member 12 is in the same position as that after rotation of 90° and almost completely blocks passage of the light again. Finally after rotation through 360°, the original position is reached. Thus, during every cycle of rotation of the chopper member 12 through 360°, light is almost completely blocked twice and the maximum amount of light is passed twice, whereby chopping of the light is achieved.

Figure 3A:
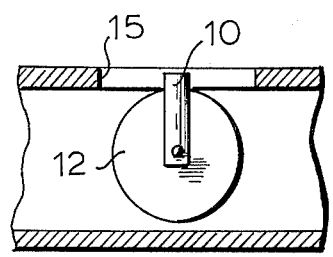
FIGS. 3 (a) and 3 (b) are partial sectional views of the chopper of FIG. 2 with the parts in different positions.
Figure 3B:
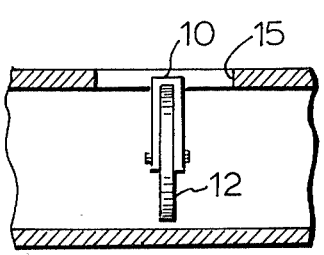

The invention is not limited to the example shown in FIG. 2 and FIGS. 3 (a) and (b). As can be readily understood, various modifications are possible. Further examples will be described and shown.

Not only can the chopper means described above be used in an infrared analyzer, but it can also be used in an ultraviolet spectrometer and other optical measuring instruments which utilize means for chopping light, such as instruments using near infrared rays, visible rays, near ultraviolet rays, laser rays, etc. The sample to be analyzed is not limited to gaseous materials. Liquids through which the light can be passed can also be analyzed.

The chopper means can be used not only in an apparatus of the single cell type but also in an apparatus of the double cell type.

Figure 4A:
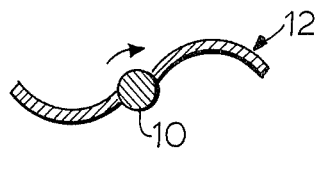
FIGS. 4 (a) and 4 (b) are a section and plan view of a second example of the chopper element of the present invention.
Figure 4B:
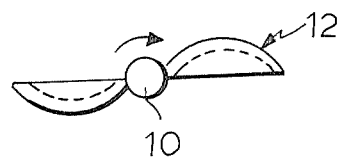

The configuration of the chopper member is not necessary a flat circular plate. It can have a regular polygonal shape or the halves of the plate can be curved or spherical, as shown in FIGS. 4 (a) and 4 (b), respectively. Furthermore, a flat plate is not necessary.

The material of which the chopper element is made can be one which intercepts all rays of various wave lengths in a light beam, for example a metal such as aluminum, or it can be a special material which intercepts only rays of a selected wavelength or range of wavelengths, such as a solid filter.

Figure 5:
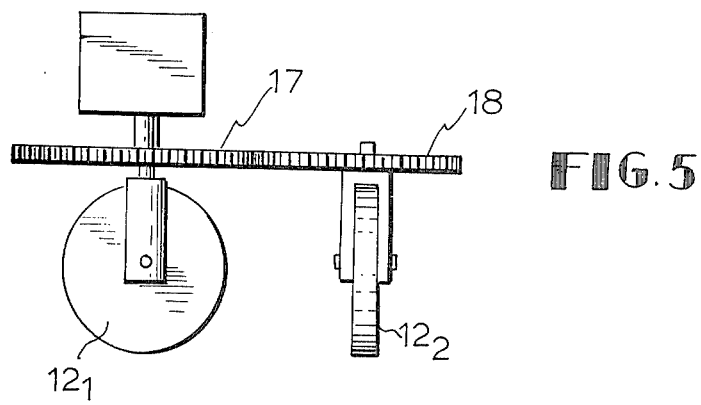
FIG. 5 is an elevation view of the third example of the chopper element according to the invention.
Figure 6A:
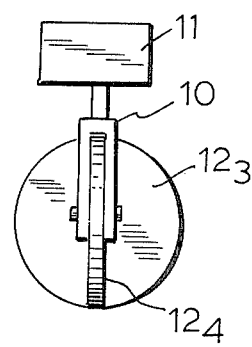
FIGS. 6 (a) and 6 (b) are an elevation and a bottom plan view, respectively, of a fourth example of the chopper element of the invention.
Figure 6B:
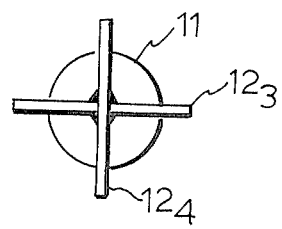

Furthermore, as shown in FIG. 5, two plate-shaped chopper elements $12_1$ and $12_2$, having light screening characteristics which are different from each other, are mounted for synchronous rotation along the length of the sample cell, being connected by two meshed gears 17 and 18 or the respective shafts supporting the chopper elements, the chopper elements being 90° out of phase during their rotation. By using such an arrangement, it becomes possible to avoid disturbance of the analysis due to the presence of foreign gases in the light path. Furthermore, as shown in FIGS. 6 (a) and (b), two plate-shaped chopper elements $12_3$ and $12_4$ having different light screening characteristics can be mounted on a single motor device shaft 10 driven by a single rotor 11, the chopper elements being perpendicular to each other.

Figure 7:
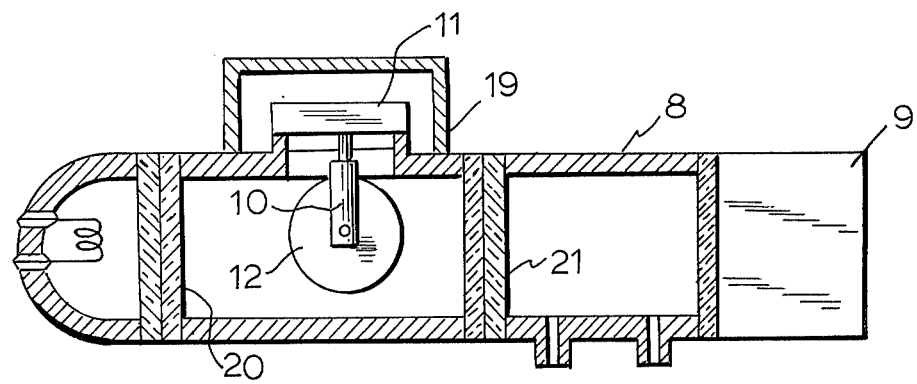
FIG. 7 is a sectional elevation of a fifth example of the optical system and chopper element of the invention.

Moreover, as shown in FIG. 7, the apparatus can have the chopper means, i.e. the motor 11 and the chopper element 12, enclosed within a casing 19 with two transparent windows 20 and 21 at the opposite ends thereof, the casing being filled with a special gas such as $CO_2$, $H_2O$ vapor a hydrocarbon gas or the like which acts to decrease the interference due to the presence of foreign gas which disturbs the spectroscopic analysis. The special gas is sealed in said casing. An apparatus having such a structure is especially effective in those cases where (a) the material to be analized contains a component which corrodes the rotatable shaft 10 and the chopper element 12; and (b) the length of the sample cell 8 is short for example where the material to be analyzed is a highly concentrated liquid or a gas.

Figure 8:
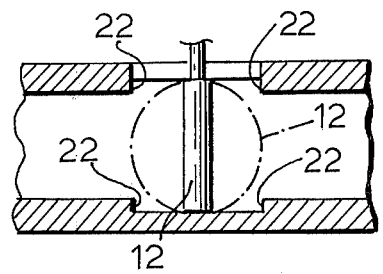
FIG. 8 is a partial sectional view of a sixth example of a chopper element of the invention.

As shown in FIG. 8, an annular recess 22 can be provided in the sample cell 8 at the position where the chopper element 12 is located with the peripheral edge of the chopper element extending into the recess 22. Thus, leakage of light at the time of blocking of light can be minimized.

Figure 9:
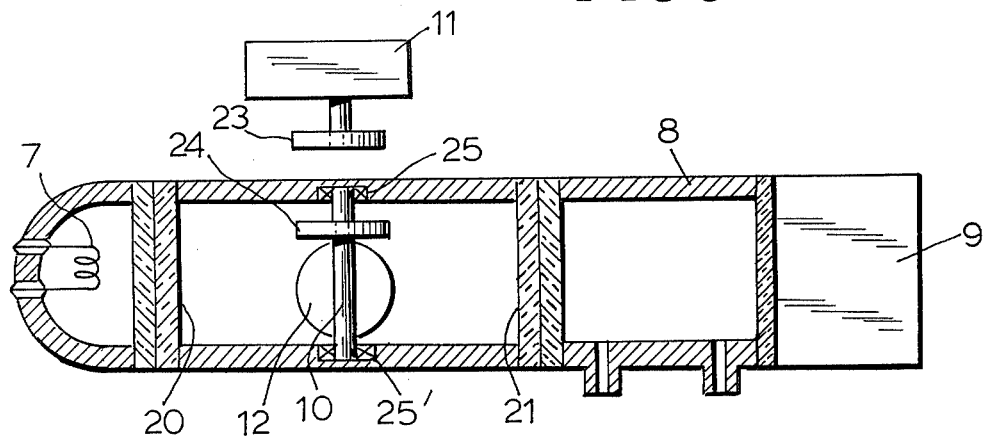
FIG. 9 is a sectional elevation of a seventh example of the optical system and chopper element of the invention.

Various mechanisms to rotate the chopper element 12 can be substituted for the motor 11 and directly driven shaft 10. A magnetic coupling as shown in FIG. 9 is one such mechanism. A rotatable plate 23 of permanent magnet material or a magnetic material such as electromagnetic soft iron plate, etc. is rotated by the motor 11 and by the action of the rotatable plate 23, another rotatable magnetic plate 24 such as an electromagnetic soft iron plate or permanent magnetic material plate and a rotatable shaft 10 in bearings 25 and $25^1$ and having the chopper element 12 fixed on it are rotated. In the embodiment shown as FIG. 9, since the chopper element 12 is positioned outside of the sample cell 8, the apparatus is especially effective for use in those cases where (a) the object to be analyzed contains a foreign substance which corrodes the rotatable shaft 10 and the chopper element 12; and/or (b) it is necessary to shorten the length of the sample cell 8 as much possible, just as with the apparatus shown in FIG. 7. The apparatus of the present invention has the following advantages.

Figure 1:
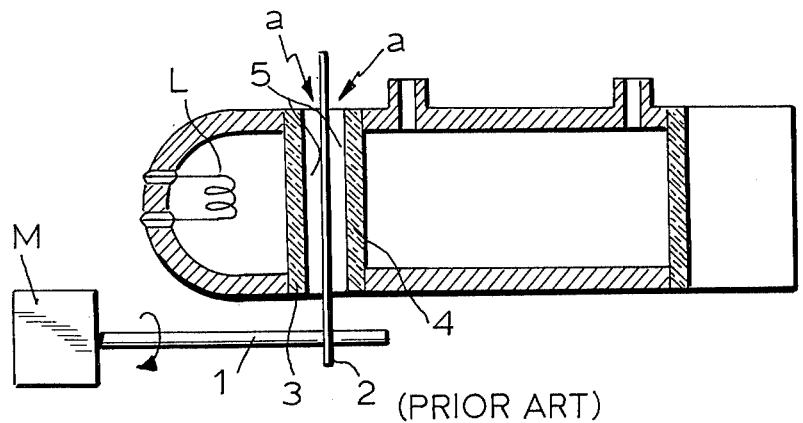
FIG. 1 is an elevation view partially in section, of a conventional apparatus according to the prior art.

1. Since the optical apparatus of the present invention does not have an air space which inevitably exists in any conventional apparatus of the prior art having the chopper mechanism as shown at 5 in FIG. 1, the exclusion of atmospheric air from the path of the light through the apparatus is easily and completely achieved. This provides a high accuracy of the spectroscopic analysis, since disturbances due to foreign gases contained in the atmospheric air are completely prevented.

2. Since no air space is present in the apparatus of the present invention, the body of the apparatus itself can be manufactured in a compact form. Especially, it is possible to make the single cell apparatus in a considerably smaller size as compared with the size of a conventional apparatus because it is unnecessary to reserve a space for the rotation of the chopper element.

Furthermore, in the present invention, the change of the quantity of light is in a regular sine curve due to the use of a simple plate-shaped chopper element. This makes it easy to handle electronically the output signal from the detector and to improve the signal-to-noise ratio of the detector.

What is claimed is:

1. An optical system for a single cell, single beam spectroscopic analyzer comprising a single light source, a single detector positioned to receive light from the light source and a single sample cell connected between the light source and the detector for containing a material to be spectroscopically analyzed and for passing light from the light source therethrough to said detector, said light source, detector and sample cell lying along an axis and having radial dimensions which are substantially the same, said system having no air gap between the light source and the detector, and a chopper means having at least one chopper element in said sample cell, a shaft in said cell on which said chopper element is mounted and extending perpendicularly to the path of light between the light source and the detector, said chopper element having a dimension perpendicular to said axis which is no greater than that of said light source, detector and sample cell, said shaft extending out of said cell, and motor means operatively connected to said shaft for rotating said chopper element around the axis of said shaft, only said motor means being outside the outer periphery of said light source, said detector and said sample cell, said chopper element being in the path of the light between the light source and the detector and having a structure for passing substantially all of the light of at least one frequency from said light source to said detector when it is in one rotational position, and for passing substantially no such light when it is in a second rotational position about 90° from said first rotational position.

2. An optical system as claimed in claim 1 in which said chopper element is a disc-shaped element.

3. An optical system as claimed in claim 1 in which said chopper element is a pair of disc-shaped elements mounted on said shaft at right angles to each other and having different transmissive characteristics with respect to the light from said light source.

4. An optical system as claimed in claim 1 in which said chopper means comprises two disc-shaped elements spaced from each other along the length of the optical system, and gear means connecting said elements for rotating them while keeping them at right angles to each other, said disc-shaped elements having different transmissive characteristics with respect to the light from said light source.

5. An optical system as claimed in claim 1 further comprising magnetic coupling means connecting said motor means and said shaft.

* * * * *